May 18, 1965 D. E. UPDYKE 3,183,602
COMBINATION POCKET AND CARPENTER'S LEVEL
Filed Jan. 24, 1963
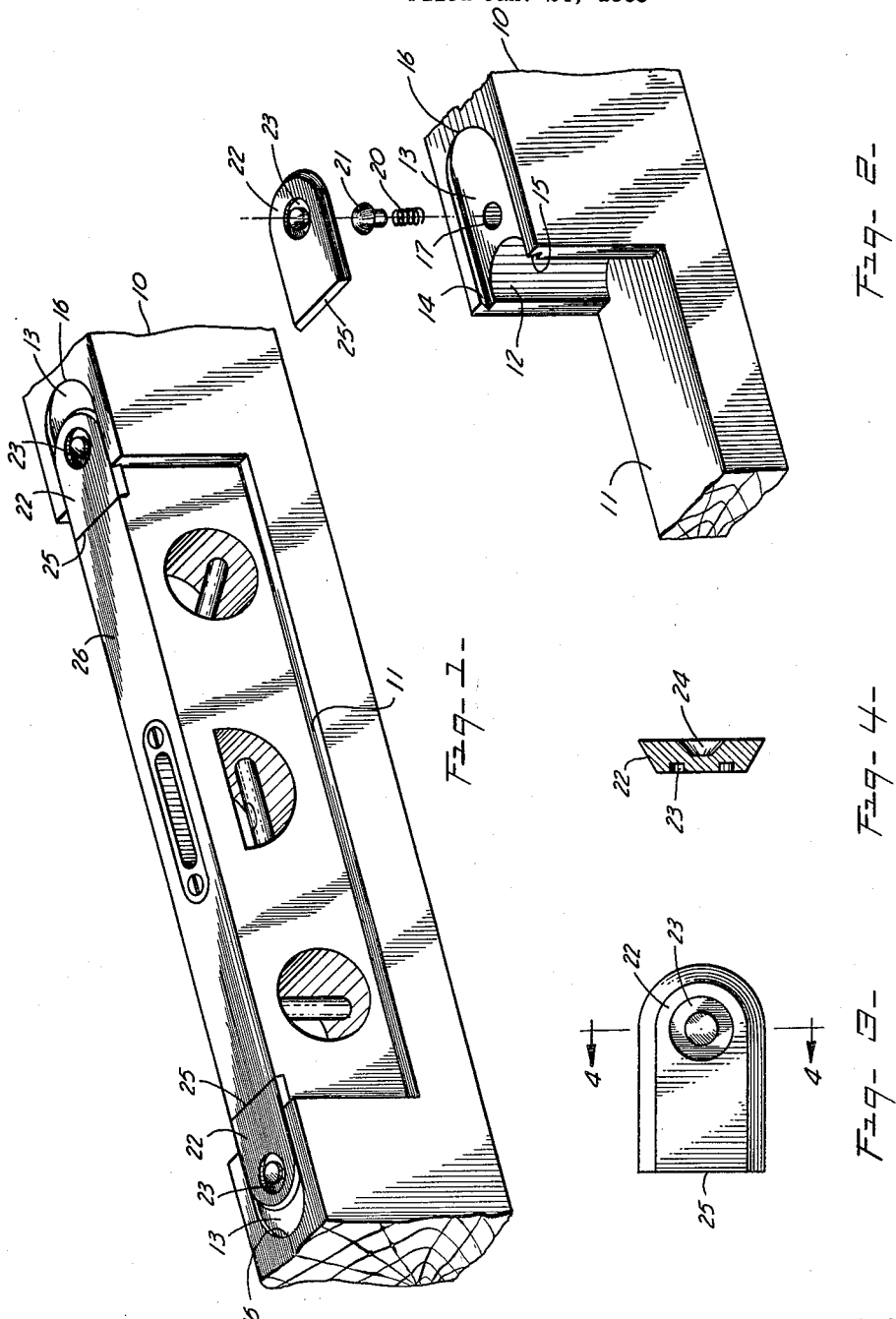
INVENTOR.
DEAN E. UPDYKE
BY
Schroeder & Siegfried
ATTORNEYS 3,183,602
COMBINATION POCKET AND CARPENTER'S
LEVEL
Dean E. Updyke, Warriors Mark, Pa.
Filed Jan. 24, 1963, Ser. No. 253,717
5 Claims. (Cl. 33—207)

This invention relates to the field of spirit levels for use in building purposes and more particularly to the field of combination spirit levels for converting a pocket-type spirit level to a carpenter's level.

For many building purposes, it is quite often necessary to use what is generally known as a "carpenter's level" employing an elongated member which is generally some two or three feet in length or longer for laying horizontal work or for raising perpendicular members. Needless to say, this type of implement is much more expensive to replace should it become damaged than a pocket-type spirit level which is generally in the nature of about one foot in length. Furthermore, it is sometimes quite convenient to carry the pocket level and when the more accurate level is needed, to have at hand a device which may convert the pocket-type level to the carpenter's level.

It is contemplated that this invention will provide a carpenter's level by the use of a pocket-type spirit level. Generally speaking, it is contemplated that a elongated member is recessed so that a pocket-type spirit level may be fitted therein, but more particularly, a new and novel means for fastening the spirit level in place is contemplated so that the spirit level will remain locked while in use and the members for locking the spirit level in place will not be accidentally moved or lost when the spirit level is removed from the elongated member.

It is therefore a general object of the present invention to provide an improvement in combination spirit levels.

It is a more specific object of this invention to provide new and novel means for converting a pocket-type spirit level to a carpenter's level.

It is yet another object of the present invention to provide a new and novel device which is adapted to hold a pocket-type spirit level having resiliently urged means for holding the level in the device.

It is still another object of the present invention to provide means for securing a pocket-type spirit level to an elongated member in one position and be frictionally held in another position when the member is not in use.

These and other objects and advantages of this invention will more fully appear from the following description, made in connection with the accompanying drawing, wherein like reference characters refer to the same or similar parts throughout the several views, and in which:

FIG. 1 is a partial view of the elongated member showing that portion incorporating the pocket-type spirit level;

FIG. 2 is a sectional view of the elongated member showing the latching arrangement;

FIG. 3 is a top view of a latch plate used in the latching means as found in FIG. 2; and FIG. 4 is a sectional view of FIG. 3 taken along lines 4—4.

An elongated member 10 has a relatively large and centrally located notch 11 cut therein as best shown in FIG. 1. The elongated member 10 may be formed from hardwood or metal and is generally selected from materials which do not have stresses remaining therein since it is desirable that when the notch 11 is cut in member 10 that the member 10 will not warp. The bottom of notch 11 is made flat and parallel with the bottom of elongated member 10 for purposes which will be apparent later. At each end of notch 11 is formed a vertically extending curved recess 12. The vertically extending recess communicates with a longitudinally extending guideway 13 which is formed therein with closed end portions for restricting the movement of a cooperating member which will slide therein. The guideways have a pair of sides 14 and 15 which are tapered upwardly where the dimensions across the guideway are smaller at the top than at the bottom. In other words, the cross section of the guideway is somewhat triangular in shape. Sides 14 and 15 terminate in an end portion 16. Situated between end portion 16 of guideway 13 and vertically extending recess 12, is a bore 17 that may be made by drilling a hole in the material. Located within the hole is a compression spring 20 which resiliently urges a dome shaped rivet 21 or similar element upwardly. Of course, any resiliently urged detent may be used as will be explained more fully.

A latching plate 22 is formed of the same cross-sectional shape as that of guideway 13 and is adapted to slide longitudinally within elongated member 10. Latch plate 22 may be made of any suitable material such as metal or plastic. A circular cut out portion 23 is located in the top of latch plate 22 to aid in moving the plate longitudinally within the guideway 13. Located in the bottom side of latch plate 22, is a recessed portion 24 (FIG. 4) which is concentrically located with cut out portion 23 and is adapted to engage the round head of the rivet-like element 21. It will be noted that engagement between recessed portion 24 and rivet 21 takes place when latch plate 22 is extended outwardly over notch 11. When latch plate 22 is moved until the curved end portion is in abutting relationship with end 16 of guideway 13, the opposite end 25 lies beyond the end of the vertically extending recess 12 in such a manner that the recess is unobstructed. In other words, an instrument such as a pocket-type spirit level 26 having end portions conforming to the recess in the ends of notch 11 may be inserted therein. For the particular embodiment shown, latch plates 22 extend into a small cut-away portion of level 26 so that the upper surface is flush with elongated member 10 but such an arrangement is not necessary for satisfactory performance of the combined level.

In use, the spirit level 26 would be inserted into notch 11 after latch plates 22 were slidably positioned against end portions 16 of guideways 13. Spirit level 26 is then inserted into the curved and vertically extending recesses 12 so that the level 26 will not wobble or rotate within notch 11. Latch plates 22 are then slidably moved towards each other to overlie the end portions of level 26. In this position, the detents 21 which are below the latch plates 22 cooperatively engage recessed portions 24 so that latch plates 22 will not be inadvertently loosened through any adverse brushing or frictional movement across the top of the latch plates. Since the bottom of notch 11 is parallel to the bottom of elongated member 10, the unit then forms a "carpenter's level" or level having a longer member for obtaining a more accurate horizontal or vertical measurement.

When it is desirable to remove the spirit level 26 from within member 10, latch plates 22 are slidably moved away from each other until stopped by the end portions 16 of guideways 13. In this position, spirit level 26 may be removed from elongated member 10 since the ends 25 of latch plate 22 are displaced beyond the internal edges of vertically extending recesses 12. Because the cross-sectional shape of guideway 13 is formed like the lower section of a triangle, plates 22 cannot be moved upwardly to fall out of engagement with guideways 13 and therefore latch plates 22 remain in place. However, should some accidental jarring or movement cause latch plates 22 to be moved inwardly towards each other, when recessed portion 24 becomes aligned with bore 17, the detent 21 again is resiliently urged into engagement with the recessed portion and holds latch plates 22 from being accidentally pushed out of engagement with guideways 13.

Thus, it will be seen that a rather simple but highly efficient means has been developed for providing a combination level from a pocket-type spirit level and an elongated member. Particularly, a latching arrangement is shown and described which locks the small pocket-type spirit level into the elongated member in such a manner that the pocket level is very securely fastened to the elongated member. When the pocket level is removed from the elongated member the same latching arrangement prevents the latching plates from accidentally falling out of the elongated member.

It will, of course, be understood that various changes may be made in the form, details, arrangement and proportions of the parts without departing from the scope of this invention which consists of the matter shown and described herein and set forth in the appended claims.

What is claimed is:

1. A combination level comprising:
   (a) an elongated member having a flat bottom surface and a relatively large notch cut therein extending downwardly from its upper surface, the lower face of said notch being parallel to said bottom surface and the vertical end walls of said notch each having a vertically extending recess formed therein, the upper surface having longitudinally extending guideways formed therein with closed end portions for restricting movement therewithin, said guideways disposed adjacent said vertically extending recesses with a bore extending downwardly within each of said guideways;
   (b) a resiliently urged detent disposed in each of said bores and extending upwardly within said guideways;
   (c) a pair of latch plates, slidable in said guideways from a first position cooperatively extending over said detents and into said large notches thereby closing the upper ends of said recesses, to a second position cooperatively extending over said detents and abutting said closed end portions of said guideways leaving said recesses open at their upper ends;
   (d) and a pocket-type spirit level disposed in said relatively large notch of said elongated member and adapted to lie between said vertically extending recesses so that said latch plates lock said spirit level into operative engagement with said elongated member.

2. The invention as set forth in claim 1 wherein each of said latch plates include a recessed bottom portion for operably engaging said detents when said plates are extended over said spirit level.

3. The invention as set forth in claim 1 wherein said latch plates and said guideways are of tapered cross-section, the upper dimensions of which are shorter than the lower dimensions.

4. A device of the class described comprising:
   (a) an elongated member having a flat bottom surface and a relatively large notch cut therein extending downwardly from its upper surface, the lower face of said notch being parallel to said bottom surface and the vertical end walls of said notch each having a vertically extending recess formed therein, the upper surface having longitudinally extending guideways formed therein with closed end portions for restricting movement therewithin, said guideways disposed adjacent said vertically extending recesses with a bore extending downwardly within each of said guideways;
   (b) a resiliently urged detent disposed in each of said bores and extending upwardly within said guideways;
   (c) and a pair of latch plates cooperatively engaging said detents and slidable in said guideways from a first position extending over said recesses to a second position abutting said closed end portions leaving said recesses open at their upper ends, said plates adapted to hold a pocket-type spirit level in said relatively large notch between said vertically extending recesses formed in said end walls when disposed in said first position and being frictionally engaged against movement away from said recesses when in said second position.

5. The invention as set forth in claim 4 wherein each of said latch plates include a recessed bottom portion for operably engaging said detents when said plates are extended over said relatively large notch.

No references cited.

ISAAC LISANN, *Primary Examiner.*